June 11, 1968  A. S. SWEETANA, JR  3,388,351
FOIL OR STRIP INDUCTOR DEVICE
Filed Feb. 14, 1964  4 Sheets-Sheet 1

WITNESSES
Theodore F. Wrobel
Edward F. Possessky

INVENTOR
Andrew S. Sweetana, Jr.
BY
ATTORNEY

June 11, 1968    A. S. SWEETANA, JR    3,388,351
FOIL OR STRIP INDUCTOR DEVICE

Filed Feb. 14, 1964    4 Sheets-Sheet 2

United States Patent Office 3,388,351
Patented June 11, 1968

3,388,351
FOIL OR STRIP INDUCTOR DEVICE
Andrew S. Sweetana, Jr., Bloomington, Ind., assignor to Westinghouse Electric Corporation, East Pittsburgh, Pa., a corporation of Pennsylvania
Filed Feb. 14, 1964, Ser. No. 344,954
4 Claims. (Cl. 333—79)

ABSTRACT OF THE DISCLOSURE

A current limiting reactor or line trap utilizing wound foil and having improved terminal construction for high currents.

---

The present invention relates to power system inductor devices and more particularly to current limiting reactors and line traps.

In power systems, inductor reactors are widely used system components which are desirably to be protected against excessive inrush current. For example, reactors are often connected in series with a switch and a capacitor bank to reduce excessive transient current during switch operation. Similarly, line traps have wide usage in power systems, primarily as 60 cycle pass filters where one or more higher frequency communication channels are superimposed on the transmission lines of the system.

Commonly, current limiting reactors and line traps are structurally designed with inductive reactance provided by insulated wire or cable or bare cable spaced with air insulation. In such form, these devices are satisfactory in many respects, but with a fundamentally different structural approach there can be provide a basis for significantly better economy in device manufacture and use as well as better device functioning, both of which in turn lead to better device marketability. The employment of wound conductive foil or strip as opposed to coiled cable is such an approach. In metal terminology, the term "foil" usually connotes a metal thickness up to .010 inch and the term "strip" or "sheet" connotes higher metal thicknesses. Since, as will subsequently become more apparent, the present invention has utility with metal thicknesses less than and in excess of .010 inch, the term "foil" or "strip" will be used herein to mean foil, strip, sheet or other similar metal description terms.

The amount of wound foil required to achieve a given amount of inductance has significantly less weight and occupies significantly less space than does the corresponding amount of cable. In part, this is because the respective conductive foil turns are separated only by a small layer of insulation and air space between foil turns is substantially eliminated. Accordingly, manufacturing economy is achieved in the usage of materials and user economy is achieved through any cost factors associated with space and weight of inductor devices considered as capital equipment. Manufacturing economy is also achieved as a result of the fact that foil winding normally is a less expensive process than cable coiling, especially if there is an excess of foil winding machine capacity in the manufacturing plant.

In operation, the interturn capacitance of the wound foil is comparatively advantageous in both the current limiting reactor and the line trap. Thus, the amount of wound foil interturn capacitance is effective to delay voltage rise across reactor foil turns when a transient voltage occurs. Consequently, voltage stress on the end reactor foil turns is limited whereas end turn voltage stress resulting from circuit transients can have damaging effects on a cable reactor device. Further, in the line trap, the wound foil interturn capacitance can be sufficient to provide self-resonance, and separate capacitor components, usually required for resonating purposes, are thus eliminated.

In other respects, it is highly feasible with wound foil to provide a broad band line trap of convenient size and weight. Such a trap, effective for example to provide at least 400 ohms impedance over the entire frequency band 30 to 200 kilocycles, normally requires an inductance of about 500 to 1000 microhenries and a cabled line trap with this rating is excessively large, weighty and costly. Further, in wound foil inductor devices generally, the wound foil experiences little or no outward dislocation force on short circuit current whereas coiled cable tends to blow outward on short circuit, and the end cable turns tend to come together, as a result of magnetically induced forces. This difference provides a distinct structural and economic advantage for wound foil devices and particularly for wound foil line traps since rigidizing bars are not required for containment when large short circuit currents are carried by the foil.

Thus, in accordance with the principles of the present invention, an inductor device comprises a supporting member on which there is provided wound foil means with successive foil turns separated by insulative means. Preferably the foil means and insulative means are integrated in the form of wound insulatively coated foil. Respective terminal connectors can be connected, preferably by weld along the foil width, to the outmost ends of the foil means and supported in relation to the support member for connection to power lines when the device is placed in use.

It is therefore an object of the invention to provide a novel wound foil inductor device which yields economy in manufacture and use.

Another object of the invention is to provide a novel wound foil inductor device which is comparatively less weighty and less bulky than are former devices.

A further object of the invention is to provide a novel wound foil current limiting reactor in which interturn capacitance is sufficient to limit effectively end turn voltage stress.

An additional object of the invention is to provide a novel wound foil line trap in which interturn capacitance is effective to provide self resonance for the trap.

Another object of the invention is to provide a novel wound foil line trap which has convenient size and weight yet which has sufficient inductance to provide broad band operation for the trap.

It is an additional object of the invention to provide a novel wound foil inductor device in which short circuit forces have little or no dislocating effect on the device.

It is a further object of the invention to provide a novel wound foil line trap in which short circuit forces have little or no dislocating effect on the line trap device and in which the usual rigidizing bars are thus not required.

These and other objects of the invention will become more apparent upon consideration of the following detailed description along with the attached drawings, in which.

Figure 1:
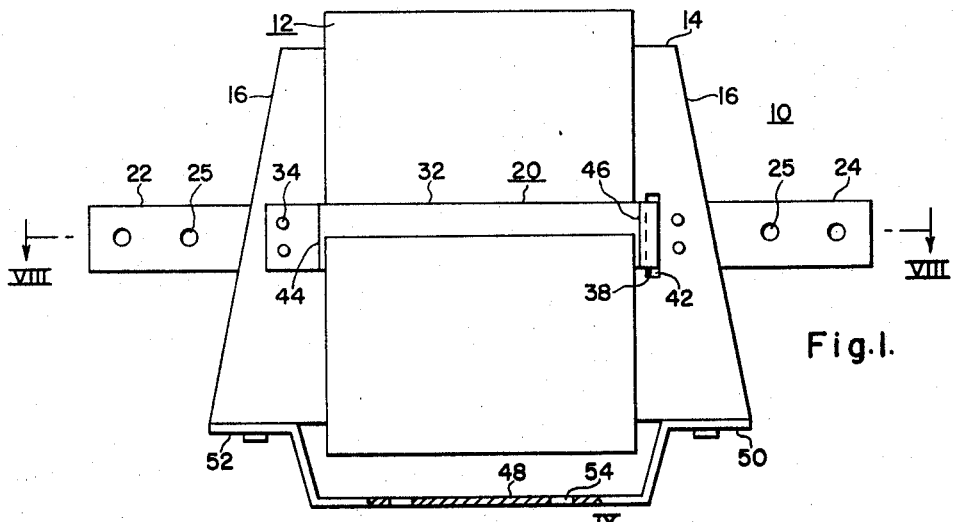
FIGURE 1 shows a front view of a current limiting reactor constructed in accordance with the principles of the invention.
Figure 2:
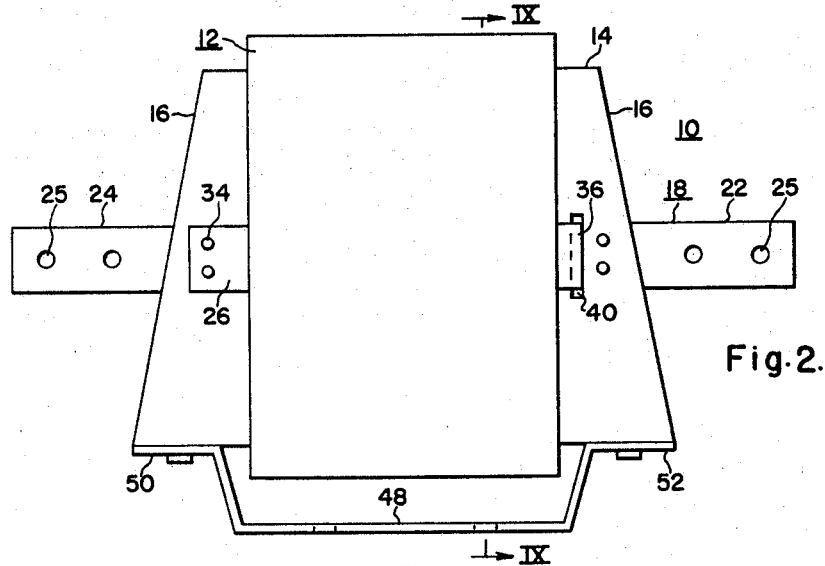
FIG. 2 shows a rear view of the reactor shown in FIG. 1.
Figure 3:
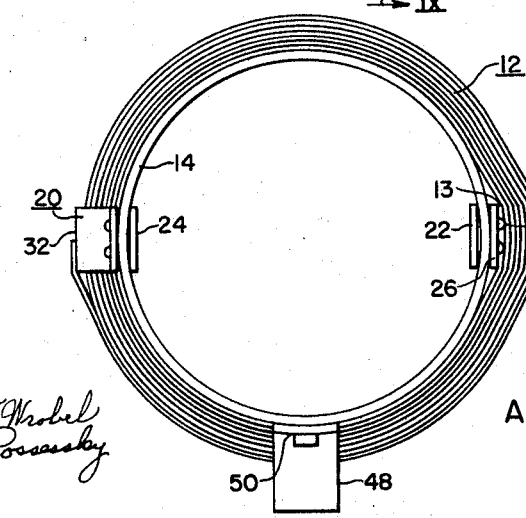
FIG. 3 shows an end view of the reactor shown in FIG. 1.
Figure 4:
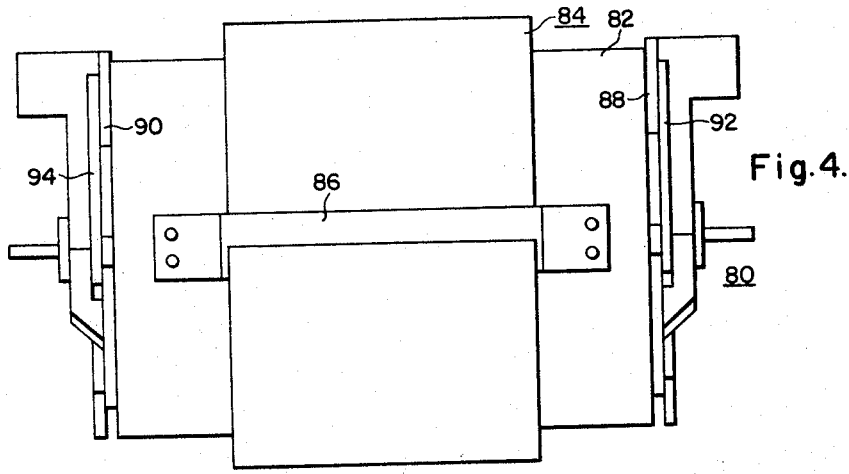
Figure 5:
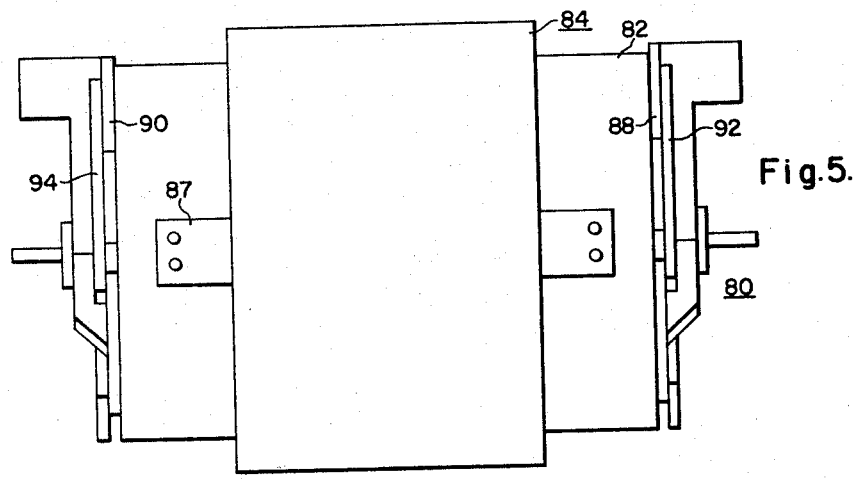
Figure 6:
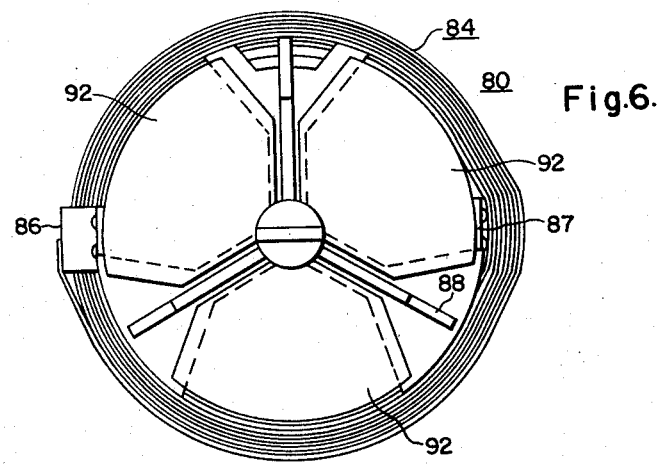
Figure 6B:
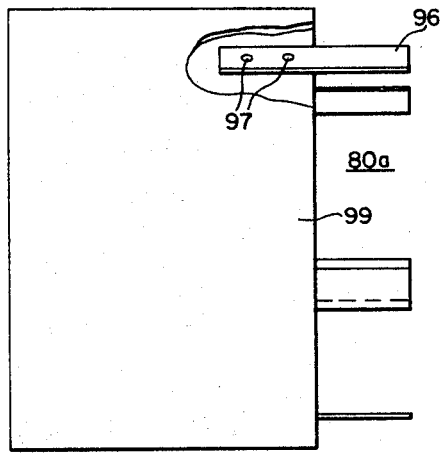
Figure 6A:
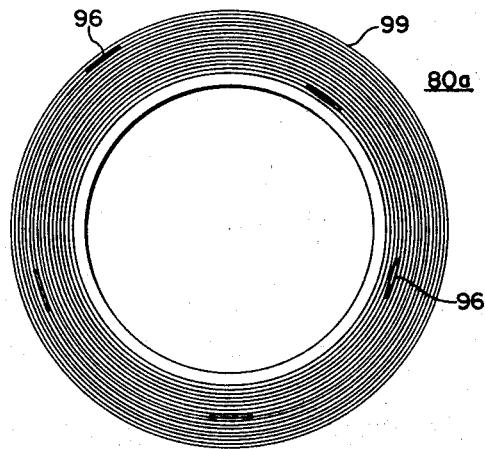
Figure 7:
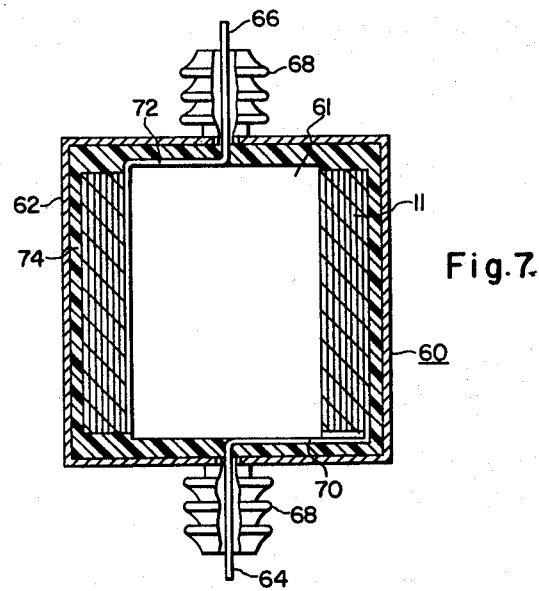
Figure 10:
Figure 8:
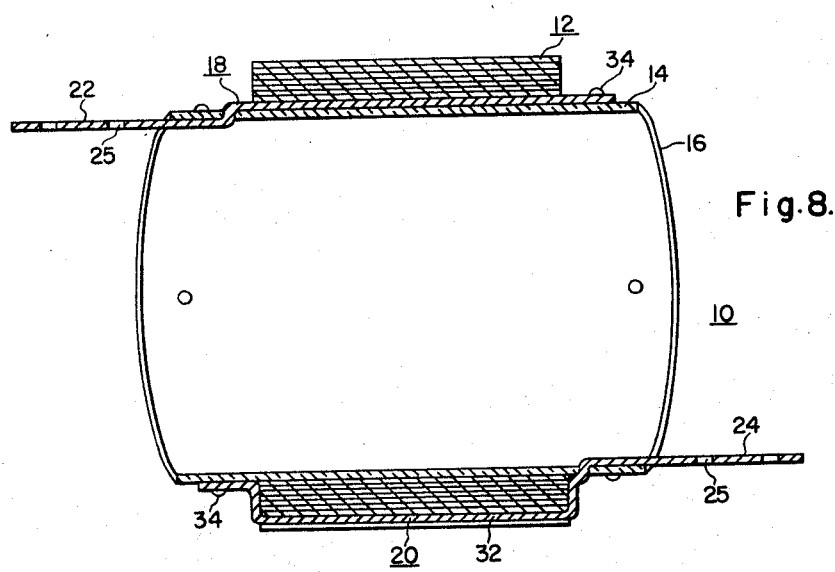
Figure 9:
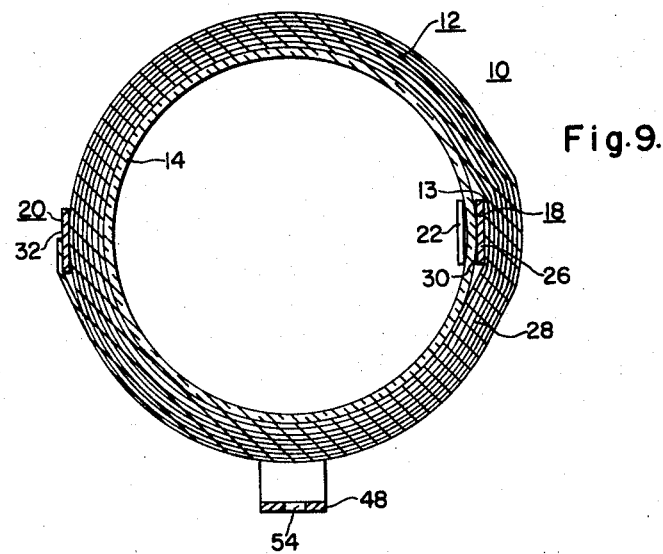

FIGS. 4-6 respectively show front, rear and end views of a line trap constructed in accordance with the principles of the invention;

FIGS. 6A and 6B are end and front views of the wound foil and insulation means portion of a modified turn-tapped line trap constructed in accordance with the principles of the invention;

FIG. 7 shows another embodiment of the invention wherein an inductor device includes a container within which wound foil is disposed and connected to terminals on the container;

FIG. 8 shows a longitudinal section taken along the reference line VIII—VIII of FIG. 1;

FIG. 9 shows a cross-section taken along the reference line IX—IX of FIG. 2; and FIG. 10 shows a cross section of one layer of foil and insulation means employed in the device of FIG. 1.

More specifically, there is shown in FIG. 1 an inductor device or current limiting reactor 10 wherein the principles of the invention are embodied. Inductance is provided for the reactor 10 by means of wound foil and insulation means 12 which are preferably supported on support means or a supporting member 14. The latter member, in turn, is preferably tubular and further is preferably formed from an electrically insulative material having a relatively low magnetic permeability such as glass epoxy. End faces 16 and 18 of the tubular supporting member 14 are sloped as shown primarily for appearance purposes.

The wound foil and insulation means 12 are preferably formed from a continuous strip 28 or foil of conductive material such as aluminum, of a cross section suitable for achieving desired device ratings, and on which there is bonded a layer 31 (FIG. 10) of electrically insulative plastic such as a polyester film. When the wound foil and insulation means 12 are so formed, the insulatively coated foil or strip 28 is wound continuously about the tubular supporting member 14 until the desired number of turns are provided. The ends of the wound strip 28 are respectively connected, preferably by means of welding completely thereacross, to respective terminal bars 18 and 20 which can be formed from aluminum or other conductive material. To facilitate the establishment of line connections, the terminals 18 and 20 respectively are provided with axially extending end terminal portions 22 and 24 in which there are provided openings 25 for line connection purposes.

More specifically, the terminal bar 18 is provided with an elongated foil connecting portion 26 which extends along a substantial portion of the length of the support member 14 and is connected or welded (through the layer 31) to an inner end portion 13 of the conductive strip 28 as shown in FIG. 9. The fact that this connection is established across the full width of the conductive strip 28 assures broad current distribution across the foil width.

Inmost side 30 of the foil connecting portion 26 is preferably disposed against the support member 14 for structural solidarity. The foil and insulation means 12 are then wound about the support member 14, and the inductance desired is, of course, a determinant of the number of turns to be provided. It is noted that the usual and well known manner in which inductance is calculated generally is not strictly applicable to foil wound inductors. It has been found, however, that if the ratio of the inner foil diameter of a foil wound inductor to the foil width is given a minimum value, say one to one, or more, best results are obtained, and inductance can be readily increased with more turns. At comparatively small ratio values of $D/W$, on the other hand, increased inductance is not readily achieved with increased turns.

Upon completion of the winding of the foil and insulation means 12, the outer terminal bar 20 is secured to the support member 14 with foil connecting portion 32 thereof extending across and connected or preferably welded (through the layer 31) to an outer end portion of the conductive strip 28 and preferably across the entire width thereof. In this manner, the necessary electrical connection is established and in addition the terminal connecting portion 32 provides nominal but adequate mechanical placement force for the foil and insulation means 12 in its wound condition. Preferably, the outer strip portion can be placed on the outer side of connecting portion 32 of the outer terminal bar 32, so as to facilitate weldment, and preferably it does not extend beyond the bar portion 32. However, the outer strip portion can be placed within the bar portion 32 and it can be extended beyond such bar portion if so desired.

Fastening means 34 or rivets or nuts and bolts can be employed to secure the terminals 18 and 20 to the support member 14, preferably such that the terminal bars 18 and 20 are disposed in diametrically opposed locations. In this instance, the line connecting end portions 22 and 24 of the terminals 18 and 20 extend axially outwardly from the support member 14 along an inner surface thereof. To provide for this disposition, each of the terminal bars 18 or 20 is provided with a double reverse elbow 36 or 38 which fits through support member slot 40 or 42. The terminal bar 20 is also provided with a pair of double elbows 44 and 46 which are respectively disposed on opposite sides of the foil and insulation means 12 so that the foil connecting terminal portion 32 is spaced outwardly of the outer surface of the support member 14 for engagement with the outer end portion of the conductive strip 28 in the manner previously described.

When placed in use, the reactor 10 can be secured on a suitable support (not shown) by mounting bracket 48. This member is preferably elongated and can be secured to the reactor support member 14 adjacent opposite ends 50 and 52 thereof by suitable fastening means (not shown) such as nuts and bolts. As shown, openings 54 in the mounting bracket 48 can be used for additional fastening means which secure the reactor 10 on its support.

Circuit connections for the reactor 10 are established with the terminal end connecting portions 22 and 24 and desired current limiting action is achieved by the inductance of the wound foil and insulation means 12. Since, in the preferred case, the foil and insulation means 12 are formed from insulatively coated conductive material, the reactor 10 is especially adaptable for use without any further containment or housing. Thus, for example, running edges 27 (FIG. 10) of the conductive foil strip 28 are insulatively separated from the exterior by edge portion 29 of bonded insulative layer 31 on the foil strip 28. Further, after suitable dipping process or the like, the entire reactor 10 can be coated with a weather protecting material, such as one having a rubber base, and the reactor 10 is then suitably equipped for outdoor use.

In another embodiment of the invention shown in FIG. 7, foil and insulation means 11 are formed by continuous and adjacent wound turns of insulative paper and conductive foil (such as aluminum foil), with the desired number and size of turns determined in accordance with standards similar to those previously described. The continuous turns of paper or foil can be provided with several layers in thickness if so desired.

The foil and insulation means 11 again are supported on suitable support member, preferably tubular, 61 within a container or can 62 to form current limiting reactor 60. Terminal means or terminals 64 and 66 with respective bushings 68 associated therewith are provided on the container 62 for establishing line connections, and leads 70 and 72 respectively associated therewith are directed into the interior of the container 62 for connection respectively with outer and inner ends of the conductive foil portion of the paper and foil winding. Preferably, insulative lining means 74 are disposed between the inner surface of the container 62 and the foil and insulation means 11 so as to assure basic insulation level requirements for the device. Further, the container 62 can be filled with insulative oil or other liquid after the foil and insulation means 11 are inserted therein as described so that better cooling and better insulation level are achieved.

The reactor 60 operates in a manner similar to that previously described for the reactor 10. However, the container 62, if formed from a conductive material, can act as a shorted turn in the FIG. 7 embodiment of the invention and as a consequence can become overheated. Nonetheless, there are some applications where the reactor 60 may be used in preference to the reactor 10 of FIG. 1 if the container 62 is metallic or conductive. Of course, if the container 62 is electrically insulative, this overheating problem is eliminated altogether.

In FIG. 4, there is shown an inductor device in the form of a line trap 80 constructed in accordance with the principles of the invention. The line trap 80 is provided with an insulative support member 82 and foil and insulation means 84 thereon in a manner similar to that previously described in connection with the FIG. 1 embodiment of the invention. Similarly, terminal bars 86 and 87 are employed for establishing line connections.

Mounting of the trap device 80 can be provided by suspension from terminals but preferably is provided by means of respective end plates or spiders 88 and 90 since the device weight usually is relatively heavy. Respective bird barrier elements 92 and 94 in turn can be held in place by the mounting spiders or plates 88 and 90 so as to prevent the entry of foreign objects or beings within the line trap supporting member 82. Such protection is especially needed if components (such as capacitors and lightning arresters) in addition to the foil and insulation means 84 are provided as a part of the electrical circuitry of the trap 80.

In many instances, however, capacitor components can be eliminated since the interturn capacitance provided by the foil and insulation means 84 can be sufficient to provide self resonance for desired line trap operation. Further, it is noted that a line trap having an inductance of 500 to 1000 microhenries or more can be achieved with the foil and insulation means 84 (preferably constructed and wound as described in connection with the current limiting reactor 10 of FIG. 1) without excessive penalty in resulting device size and weight. This characterizes the line trap 80 as being convenient for "broad band" operation, that is such that the trap 80 provides at least 400 ohms impedance over at least the frequency band of 30 to 200 kilocycles. Broader band operation can be achieved should the stated frequency band be extended to cover a broader frequency range.

On the other hand, if broad band operation is not desired, tap means or leads 96 (FIGS. 6A, 6B) in wound foil and insulation means 99 can be suitably connected (as by one or more spot attachments 97) such that the tap-off value of inductance from any given lead 96 in combination with the included interturn capacitance (and any employed capacitor components in modified trap 80a) cooperate to provide an impedance curve such that a specific frequency channel (or channels if more than one lead 86 is used) is provided for line trap operation within the designated frequency band. If desired, the leads 96 can be located at say every second or third turn. Since the leads 96 carry only communication current and no power line current, these connecting elements can be relatively small in cross-section.

Further, it is noted that since the foil and insulation means 84 experience relatively little or no dislocation force upon the flow of short circuit current therethrough, it is unnecessary to provide rigidizing support against the short circuit forces usually experienced in coiled wire or cable inductor devices or traps. Hence, rigidizing insulating bars about the exterior of the foil and insulation means 84 are unnecessary. The terminal bar 86, in contrast, simply establishes one of the necessary connections to the trap 80 and in addition adequately retains the foil and insulation means 84 against unwinding due to mechanical jarring forces or the like.

In the foregoing description, several embodiments have been described to point out the principles of the invention. Accordingly, it is desired that the invention be not limited by the embodiments described, but, rather, that it be accorded an interpretation consistent with the scope and spirit of its broad principles.

What is claimed is:

1. A reactor for use in providing reactance in relatively high power capacity systems, said reactor comprising an elongated generally tubular electrically insulative support member and wound foil and insulation means including a conductive strip disposed thereon, said conductive strip having a width at least as small as a dimension approximately equal to that of the inner diameter of said foil and insulation means, a pair of elongated terminal bars extending along said support member and secured thereto, one of said terminal bars having an elongated portion thereof disposed within said foil and insulation means and the other terminal bar having an elongated portion thereof disposed substantially externally of said foil and insulation means, said one and said other terminal bars respectively connected electrically to inner and outer ends of said foil means conductive strip across substantially the entire width thereof, and means enabling said terminal bars to be connected into a circuit.

2. A reactor for use in providing reactance in relatively high power capacity systems, said reactor comprising a support member and wound foil and insulation means including a conductive strip disposed therein, a pair of elongated terminal bars extending along said support member and secured thereto, one of said terminal bars having an elongated portion thereof disposed within said foil and insulation means and the other terminal bar having an elongated portion thereof disposed substantially externally of said foil and insulation means, said one and said other terminal bars respectively connected electrically to inner and outer ends of said foil means conductive strip across substantially the entire width thereof, and means enabling said terminal bars to be connected into a circuit.

3. A reactor for use in providing reactance in relatively high power capacity systems, said reactor comprising a support member and wound foil and insulation means including a conductive strip disposed thereon, a pair of elongated terminal bars extending along said support member and secured thereto, one of said terminal bars having an elongated portion thereof disposed within said foil and insulation means, the other terminal bar having an elongated portion thereof disposed substantially externally of said foil and insulation means, said one and said other terminal bars respectively welded electrically to inner and outer ends of said foil and insulation means across substantially the entire width thereof so as to provide respective electrical connections therebetween and also to provide relatively nominal but adequate mechanical force for maintaining said foil and insulation means in place, and means enabling said terminal bars to be connected into a circuit.

4. A reactor for use in providing reactance in relatively high power capacity systems, said reactor comprising an elongated support member and wound foil and insulation means disposed thereon, said foil and insulation means comprising a conductive strip having an insulative layer bonded to the edge and side surfaces thereof, a pair of elongated terminal bars extending along said support and secured thereto, one of said terminal bars having an elongated portion thereof disposed within said foil and insulation means and the other terminal bar having an elongated portion thereof disposed substantially externally of said foil and insulation means, said one and said other terminal bars respectively welded electrically to inner and outer ends of said conductive strip through a portion of the associated insulative layer and across substantially the entire width of said conductive strip, and means enabling said terminal bars to be connected into a circuit.

References Cited
UNITED STATES PATENTS

| | | | |
|---|---|---|---|
| 217,466 | 7/1879 | Conte | 333—31 |
| 2,440,652 | 4/1940 | Beverly | 333—31 |
| 2,504,178 | 4/1950 | Burnham et al. | 333—31 |
| 2,521,513 | 5/1950 | Gray | 333—31 |
| 3,068,433 | 11/1962 | Wroblewski | 333—205 |
| 3,141,145 | 7/1964 | Barrett | 333—79 |
| 3,163,833 | 12/1964 | Burson | 333—79 |
| 3,163,839 | 12/1964 | Zack | 336—192 |

ELI LIEBERMAN, *Primary Examiner.*

C. BARAFF, *Assistant Examiner.*